(No Model.) 2 Sheets—Sheet 1.

J. H. CARAWAY.
FLOOD GATE.

No. 505,390. Patented Sept. 19, 1893.

Witnesses,

Inventor:
John H. Caraway,
By James L. Norris, Atty.

(No Model.) 2 Sheets—Sheet 2.

J. H. CARAWAY.
FLOOD GATE.

No. 505,390. Patented Sept. 19, 1893.

Witnesses.
Robert Errett.
J. A. Saul.

Inventor.
John H. Caraway.
By James L. Norris
Atty.

UNITED STATES PATENT OFFICE.

JOHN H. CARAWAY, OF CHRISMAN, ILLINOIS.

FLOOD-GATE.

SPECIFICATION forming part of Letters Patent No. 505,390, dated September 19, 1893.

Application filed June 8, 1893. Serial No. 476,959. (No model.)

*To all whom it may concern:*

Be it known that I, JOHN H. CARAWAY, a citizen of the United States, residing at Chrisman, in the county of Edgar and State of Illinois, have invented new and useful Improvements in Flood-Gates, of which the following is a specification.

This invention relates to flood-gates employed to prevent the passage of live stock from one pasture or place to another through a creek or other water course.

The object of my present invention is to provide a new and improved flood-gate wherein an upper gate section swinging in a horizontal plane, and a lower gate section rocking in a vertical plane, are automatically closed by a weight, while the lower gate section can remain closed if frozen or held by ice, without interfering with the opening and closing of the upper gate section.

To accomplish this object my invention consists essentially in the combination of a lower gate section, an upper gate section having a flexible connection with the lower gate section, and a weight operating to automatically close the upper gate section, whereby the lower gate section is closed by the flexible connection, and when held closed will not interfere with the opening and closing of the upper gate section.

The invention also consists in certain other features of construction and combination or arrangement of parts hereinafter described and claimed, reference being made to the accompanying drawings, in which—

Figure 1:
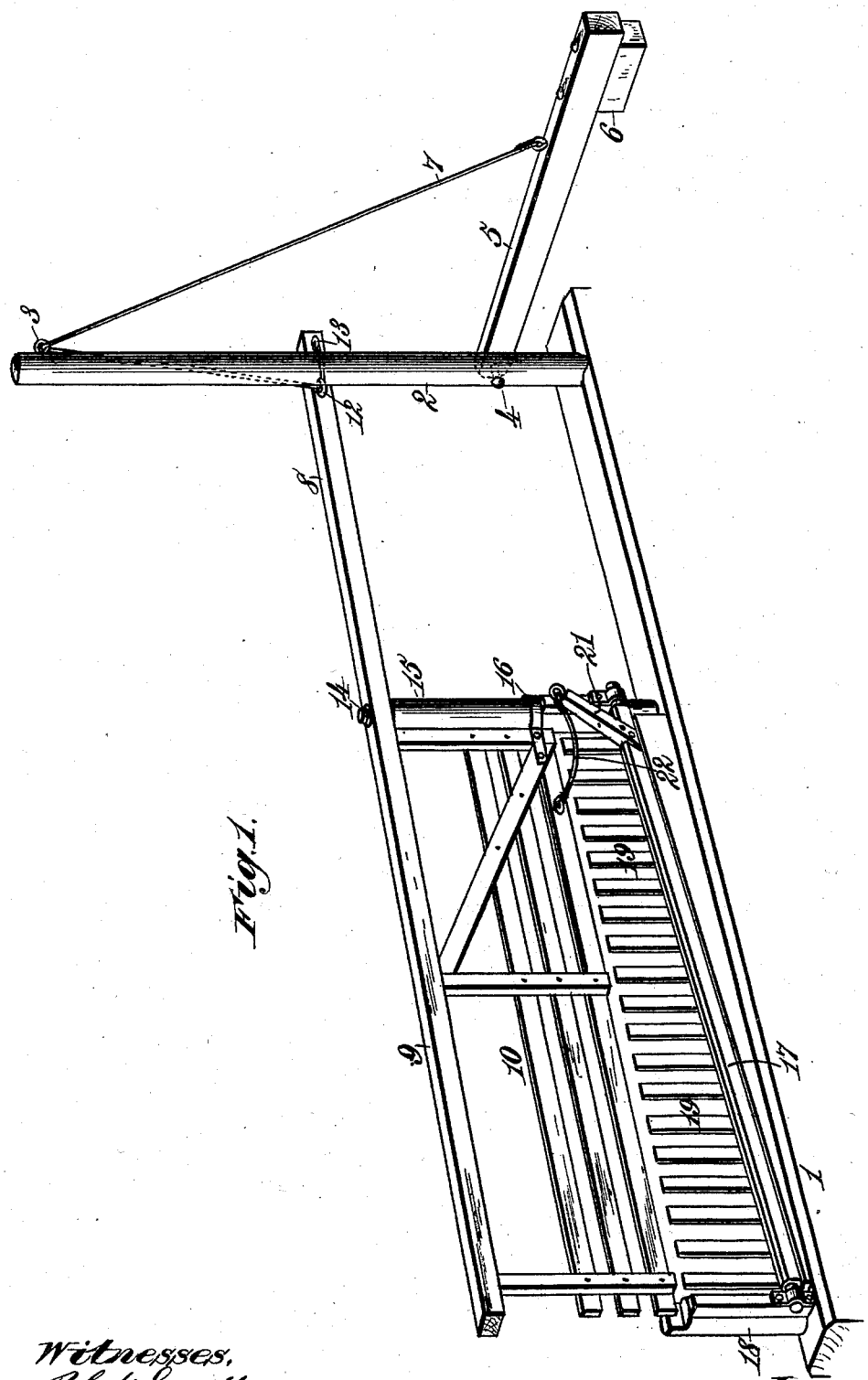
Figure 2:
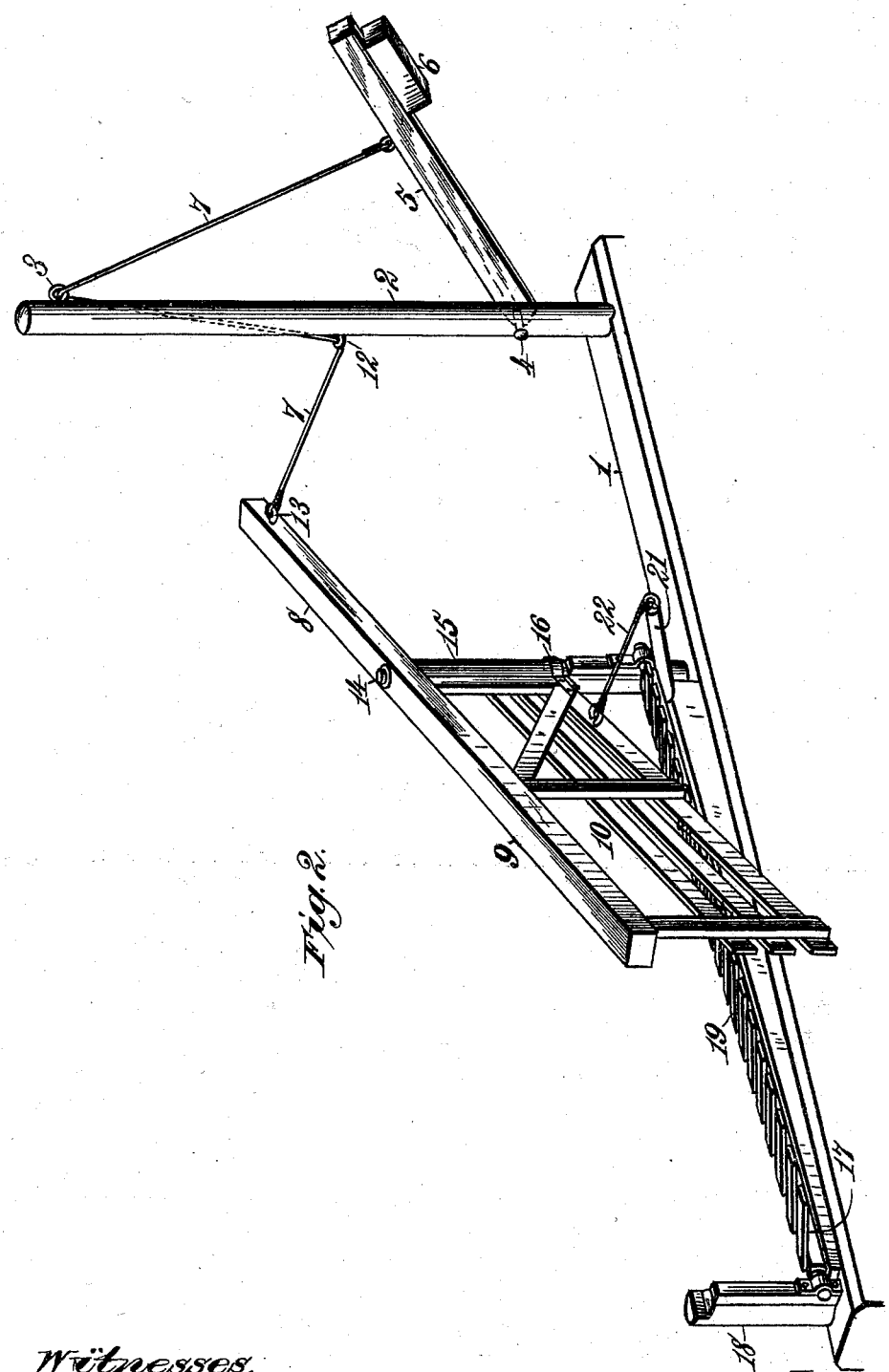

Figure 1 is a perspective view of a flood-gate constructed in accordance with my invention, both gates being closed; and Fig. 2 is a similar view, showing both gates partly open.

In order to enable those skilled in the art to make and use my invention, I will now describe the same in detail, referring to the drawings, wherein—

The numeral 1 indicates a suitable foundation, which may be composed of a timber or beam, to one end of which is rigidly secured a stanchion 2, having at its upper end portion a guide 3, composed of a pulley or any other suitable device. To the lower end portion of the stanchion is pivoted, as at 4, a swinging beam 5, having an attached counterweight 6, and connected by a cable 7 with the extended end 8 of the top beam 9 of a horizontally swinging gate section 10, said cable passing around the guide 3, thence downwardly through a guide 12 on the stanchion 2, and connected, as at 13, with the extension 8. The top beam 9 of the gate section 10 is journaled, as at 14, to the upright or gate post 15, and the lower portion of the gate section 10 is preferably connected with the upright or gate-post by a circular collar 16 loosely surrounding the upright or gate-post, and rigidly secured to the gate, whereby the latter can swing in a horizontal plane. The weight-carrying beam 5 is adapted to swing in a vertical plane on the pivot 4, and when the gate section 10 is open, the extension 8 of the top beam 9 operates through the cable 7 to swing the weight-carrying beam in an upward direction, and when the gate is released the descent of the weight-carrying arm operates to swing the gate to its closed position, as indicated in Fig. 1.

The lower rocking gate section is composed of a horizontal rock shaft 17, having its ends journaled respectively to the upright or gate-post 15 and a short post 18 rising from the foundation or base beam 1. The rock-shaft is provided with a series of slats 19 of sufficient length nearly to close the space between the foundation or base beam 1 and the lower edge of the horizontally swinging gate section 10, so that when both gate sections are closed, as in Fig. 1, it is impossible for live stock to pass from one pasture or inclosure to another by following the creek or other water course.

The two gate sections may be composed of any desired arrangement of planks, boards, or slats, and therefore I do not wish to be understood as confining myself to the particular arrangement illustrated.

The rock-shaft 17 of the lower gate section is provided with a rigidly attached inclined arm 21, having a flexible connection 22 with the upper gate section 10 in such manner that the latter can freely swing open even if the lower gate section be held in a closed position by ice or otherwise, but if both gate sections are open, the closing of the upper gate section, through the flexible connection 22, closes the lower gate section.

The two gates are susceptible of yielding automatically to the current, the upper gate section swinging to its open position in a horizontal plane, and the lower gate section moving or rocking to its open position in a vertical plane by the turning of the rock-shaft 17 in its bearings on the posts 15 and 18.

If the stream is frozen, the lower gate section is usually held stationary by the ice, and where floods occur the power of the water will swing the upper gate section open, which action is rendered possible by the flexible connection between the upper and lower gate sections.

The cable 7 and the flexible connection 22 may be composed of link chains or ropes which possess the requisite strength for the purposes in hand.

Having thus described my invention, what I claim is—

1. The combination in a flood-gate, of an upper swinging gate section, a lower rocking gate section, a flexible connection between the upper and lower gate sections, and a weight acting on the upper gate section to close the same, said flexible connection serving to close the lower gate section but permitting the upper section to open while the lower section remains closed, substantially as described.

2. The combination of an upper gate section pivoted to swing in a horizontal plane, a lower gate section pivoted to rock in a vertical plane, a flexible connection between the upper and lower gate sections, and a weight acting on the upper section to close the same, said flexible connection serving to close the lower gate section but permitting the upper section to open while the lower section remains closed, substantially as described.

3. The combination of an upright or gate-post, a stanchion having cable guides, a pivoted weight carrying arm, an upper gate section journaled on the post, a cable connecting the weight-carrying arm with the upper gate section, a pivoted lower gate section, and a flexible connection between the upper and lower sections which serves to close the lower gate section when the upper gate section is closed, and permits the latter to open if the lower gate section is held closed, substantially as described.

4. The combination of an upright or gate-post, a horizontally-swinging gate mounted on the upright or gate post, a lower gate section having a rock-shaft supported in suitable bearings, a flexible connection between the upper gate section and the rock-shaft, and a weight acting on the upper gate section to close the same, substantially as described.

In testimony whereof I have hereunto set my hand in presence of two subscribing witnesses.

JOHN H. CARAWAY.

Witnesses:
WILEY ROGERS,
W. C. LeRoy.